US010609281B2

United States Patent
Smith

(10) Patent No.: US 10,609,281 B2
(45) Date of Patent: Mar. 31, 2020

(54) CAMERA CALIBRATION

(71) Applicant: Imagination Technologies Limited, Kings Langley (GB)

(72) Inventor: Timothy Smith, London (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 15/939,504

(22) Filed: Mar. 29, 2018

(65) Prior Publication Data

US 2018/0288318 A1 Oct. 4, 2018

(30) Foreign Application Priority Data

Mar. 29, 2017 (GB) .................................. 1705045.1

(51) Int. Cl.
*H04N 5/232* (2006.01)
*G06T 7/80* (2017.01)
*H04N 17/00* (2006.01)

(52) U.S. Cl.
CPC .......... *H04N 5/23232* (2013.01); *G06T 7/80* (2017.01); *H04N 5/23216* (2013.01); *H04N 17/002* (2013.01); *G06T 2207/10016* (2013.01)

(58) Field of Classification Search
None
See application file for complete search history.

(56) References Cited

U.S. PATENT DOCUMENTS

| 9,733,071 | B2* | 8/2017 | Hild | G01B 11/245 |
|---|---|---|---|---|
| 2003/0219146 | A1* | 11/2003 | Jepson | G06K 9/32 |
| | | | | 382/103 |
| 2008/0267601 | A1* | 10/2008 | Kobayashi | G03B 13/32 |
| | | | | 396/91 |
| 2010/0033677 | A1* | 2/2010 | Jelinek | G06K 9/00604 |
| | | | | 351/208 |
| 2010/0111370 | A1* | 5/2010 | Black | G06K 9/00369 |
| | | | | 382/111 |
| 2012/0015825 | A1* | 1/2012 | Zhong | G01N 21/6428 |
| | | | | 506/6 |
| 2014/0232879 | A1* | 8/2014 | Gottwals | H04N 17/002 |
| | | | | 348/188 |

(Continued)

FOREIGN PATENT DOCUMENTS

| EP | 3 306 267 A1 | 4/2018 |
|---|---|---|
| WO | 2016/153224 A1 | 9/2016 |
| WO | 2016/189878 A1 | 12/2016 |

OTHER PUBLICATIONS

Klein et al., "Parallel Tracking and Mapping for Small AR Workspaces," Active Vision Laboratory, Dep't of Engineering Science, University of Oxford, 6th IEEE and ACM International Symposium on Mixed and Augmented Reality, ISMAR 2007.

*Primary Examiner* — James M Hannett
(74) *Attorney, Agent, or Firm* — Potomac Law Group, PLLC; Vincent M DeLuca

(57) ABSTRACT

A method of calibrating a camera performs a first calibration for frames of a sequence captured by the camera to calculate for those frames first calibration data for a set of one or more camera parameters; performs, for selected frames of the sequence, a second calibration to calculate second calibration data for the selected frames in dependence on the first calibration data for those frames; and uses the second calibration data in the first calibration performed for subsequent frames of the sequence.

19 Claims, 7 Drawing Sheets

(56) References Cited

U.S. PATENT DOCUMENTS

| | | | |
|---|---|---|---|
| 2014/0285676 A1* | 9/2014 | Barreto | H04N 17/002 |
| | | | 348/187 |
| 2016/0275682 A1 | 9/2016 | Natroshvili | |
| 2017/0228864 A1* | 8/2017 | Liu | G06T 7/80 |
| 2019/0109975 A1* | 4/2019 | Linderoth | H04N 5/232 |

* cited by examiner

CAMERA CALIBRATION

This invention relates to methods and apparatuses for calculating calibration parameters for a camera.

BACKGROUND

Camera calibration typically relates to the process of estimating, or calculating, parameters associated with a camera that may affect image processing. These parameters may be referred to as calibration parameters. The calibration parameters may include parameters of the lens and image sensor of the camera, and/or parameters relating to the physical location and/or orientation of the camera relative to a scene. Knowledge of these parameters may be used for various aspects of the imaging process. For example, knowledge of the calibration parameters can be used to correct for lens distortion, measuring the size of an object in world coordinates and determining the location and/or orientation of the camera relative to a scene. As such, knowledge of a set of camera calibration parameters may be useful in a variety of applications including, for example, navigation systems, augmented reality scene construction, 3-D scene reconstruction or robotics.

Calibration parameters may broadly be classified into two groups: extrinsic parameters and intrinsic parameters. Extrinsic parameters define the location and orientation of the camera with respect to a scene. More particularly, the extrinsic parameters may define the location and orientation of a camera reference frame with respect to a world reference frame. That is, the extrinsic parameters may map camera coordinates to world coordinates. The origin of the camera coordinate system, or reference frame, may conveniently be taken to be at the camera's optical centre. The extrinsic parameters may comprise translational and rotational components.

The intrinsic parameters may map the camera coordinates into the image plane of the camera. The intrinsic parameters may represent a transformation from the camera's 3D coordinates into 2D image coordinates. The intrinsic parameters may additionally map coordinates in the image plane to pixel coordinates of an image. Thus the intrinsic parameters may map coordinates in the camera reference frame to pixel coordinates of an image point. The intrinsic parameters may comprise one or more of the camera's focal length, optical centre (also known as the principle point) and pixel skew coefficients.

A schematic illustration of the relationship between the intrinsic and extrinsic parameters is shown in FIG. 1.

A triangular object 101 is an object of a scene having a position in the scene specified with respect to a three-dimensional world coordinate system, or world frame, $(X_W, Y_W, Z_W)$. A vertex of the triangle 105 is a scene point $P_w$ having a position in the world coordinate frame given by $P_w=(x_w, y_w, z_w)$.

A camera (not shown) defines a three-dimensional camera coordinate system, or camera frame, $(X_c, Y_c, Z_c)$. The origin of the camera frame is the optical centre, or centre of perspective projection of the camera. The camera has an associated image plane 103 located at a distance f from the optical centre, where f is the focal length of the camera. Points within the image plane can be defined with respect to a two-dimensional image plane coordinate system (or image plane frame), denoted $(X_i, Y_i)$. The origin of the image plane frame may be coincident with the centroid of the image plane.

The scene point $P_w$ corresponds to an associated image point $P_i$ having a position in the image plane frame given by $P_i=(x_i, y_i)$.

The extrinsic parameters may be those that define the transformation between the known world reference frame $(X_W, Y_W, Z_W)$ and the unknown camera frame $(X_c, Y_c, Z_c)$. The position of the scene point in the camera reference frame is denoted $P_C$. Thus, in this example, the extrinsic parameters may define the transformation between the position of the scene point $(P_w=(x_w, y_w, z_w))$ in the world reference frame and its position in the camera frame $(P_c=(x_c, y_c, z_c))$. The intrinsic parameters may define the transformation between the camera reference frame and the image plane reference frame (i.e. the mapping between the position of a point defined in the camera reference frame $(P_c=(x_c, y_c, z_c))$ and its associated position in the image plane frame $(P_i=(x_i, y_i))$. Thus it can be appreciated that knowledge of both the necessary extrinsic and intrinsic parameters can define a mapping, or transformation, between points $P_w$ and $P_i$.

The intrinsic parameters may further define a transformation between image plane coordinates and pixel coordinates. The pixel coordinates may be defined with respect to a pixel frame that lies in the image plane. The transformation between the image plane reference frame and pixel frame may account for artefacts such as lens distortion and pixel skew.

One way to obtain values for the calibration parameters is to perform a calibration using a known calibration pattern. In this approach one or more images are taken of a calibration pattern located in a known position in space and having a known geometry. The calibration parameters are then estimated using these images and the known position and geometry of the calibration pattern. This approach suffers from the drawback that it requires the use of a dedicated physical component (i.e. the calibration pattern). In addition, the camera cannot be used for its intended purpose during the calibration procedure because it is restricted to imaging the calibration pattern.

An alternative approach to obtain values of the calibration parameters is to estimate them from 'real' image sequences captured by the camera (i.e. image sequences captured by the camera during its intended use). In this regard, algorithms have been developed for use in performing real-time, or per-frame, camera calibration. An example of one such algorithm is the Simultaneous Localization and Mapping (SLAM) algorithm.

SUMMARY OF INVENTION

According to one aspect of the present disclosure there is provided a method of calibrating a camera, comprising: performing a first calibration for frames of a sequence captured by the camera to calculate for those frames first calibration data for a set of one or more camera parameters; performing, for selected frames of the sequence, a second calibration to calculate second calibration data for the selected frames in dependence on the first calibration data for those frames; and using the second calibration data in the first calibration performed for subsequent frames of the sequence.

The first calibration may be a real-time calibration performed on frames of the sequence.

The first calibration may be performed on each of the frames of the sequence.

The second calibration may be a non-real time calibration.

The method further may comprise the step of selecting frames for the second calibration.

Frames may be selected for the second calibration in dependence on the first calibration data for those frames.

Frames may be selected for the second calibration further in dependence on image metadata associated with those frames.

Frames may be selected for the second calibration by periodically selecting a frame.

The step of performing the first calibration for a frame of the sequence may comprise performing an incremental calibration based on the first calibration data calculated for a previous frame of the sequence.

The second calibration for a selected frame may use calibration data for a plurality of historic frames of the sequence to determine the second calibration data for that selected frame.

The second calibration data may be used to apply corrections to estimates of calibration data calculated as part of the first calibration for subsequent frames of the sequence.

Each of the corrections may be determined from a comparison of the second calibration data for a selected frame and the first calibration data of that selected frame.

The second calibration data for a selected frame may be used to apply a correction to an estimate of calibration data calculated as part of the first calibration for one or more frames of the sequence subsequent to that selected frame.

For each of said one or more frames of the sequence subsequent to that selected frame, the first calibration data may be determined from: i) an estimate of the set of camera parameters determined from an incremental calibration; and ii) a correction determined from a comparison of the second calibration data for the selected frame and the first calibration data for that selected frame.

The correction may be applied in its entirety to the estimate of calibration data for a single frame of the sequence subsequent to that selected frame.

The correction may be applied incrementally to the estimates of calibration data for a plurality of frames of the sequence subsequent to that selected frame.

The set of one or more calibration parameters may comprise intrinsic and/or extrinsic parameters of the camera.

The intrinsic parameters may include at least one of: the focal length, optical centre of the camera, radial distortion parameters and pixel skew coefficients.

The extrinsic parameters may include at least one of: the camera's position, the camera's orientation and the camera's pose.

According to another aspect of the present disclosure there is provided an apparatus for calibrating a camera capturing a sequence of frames, the apparatus comprising: a first calibration unit configured to perform a first calibration for frames of the sequence to calculate for those frames first calibration data for a set of one or more camera parameters; and a second calibration unit configured to perform, for selected frames of the sequence, a second calibration to calculate second calibration data for the selected frames in dependence on the first calibration data for those frames; wherein the first calibration unit is configured to use the second calibration data to perform the first calibration for subsequent frames of the sequence.

The first calibration unit may comprise a selector unit configured to select frames for the second calibration.

The selector unit may be configured to select frames for the second calibration in dependence on the first calibration data for those frames The selector unit may be configured to select frames for the second calibration further in dependence on image metadata associated with those frames.

The selector unit may be configured to select frames for the second calibration by periodically selecting a frame.

The first calibration unit may be configured to, as part of the first calibration for a frame of the sequence, perform an incremental calibration for the frame based on the first calibration data calculated for a previous frame of the sequence.

The second calibration unit may be configured to calculate the second calibration data for a selected frame of the sequence using calibration data for a plurality of historic frames of the sequence.

The first calibration unit may comprise: a correction unit configured to use the second calibration data for selected frames to calculate corrections; and a calibration calculation unit configured to calculate estimated calibration data as part of the first calibration for subsequent frames of the sequence and to apply corrections to those estimates.

The corrector unit may be configured to determine each of the corrections from a comparison of the second calibration data for a selected frame and the first calibration data of that selected frame.

The calibration calculation unit may be configured to apply a correction determined from the second calibration data for a selected frame to an estimate of calibration data calculated as part of the first calibration for one or more frames of the sequence subsequent to that selected frame.

The calibration calculation unit may be configured to determine the first calibration data for each of the said one or more frames of the sequence subsequent to the selected frame from: i) an estimate of the set of camera parameters determined from an incremental calibration; and ii) a correction determined from a comparison of the second calibration data for the selected frame and the first calibration data for that selected frame.

The calibration calculation unit may be configured to apply the correction in its entirety to the estimate of calibration data for a single frame of the sequence subsequent to that selected frame.

The calibration calculation unit may be configured to apply the correction incrementally to the estimates of calibration data for a plurality of frames of the sequence subsequent to that selected frame.

The set of one or more calibration parameters may comprise intrinsic and/or extrinsic parameters of the camera.

The intrinsic parameters may include at least one of: the focal length, optical centre of the camera, radial distortion parameters and pixel skew coefficients.

The extrinsic parameters may include at least one of: the camera's position, the camera's orientation and the camera's pose.

There may be provided an apparatus configured to perform any of the methods described herein.

The apparatus for calibrating a camera may be embodied in hardware on an integrated circuit. There may be provided a method of manufacturing, at an integrated circuit manufacturing system, the apparatus for calibrating a camera. There may be provided an integrated circuit definition dataset that, when processed in an integrated circuit manufacturing system, configures the system to manufacture the apparatus. There may be provided a non-transitory computer readable storage medium having stored thereon a computer readable description of an integrated circuit that, when processed in an integrated circuit manufacturing system, causes the integrated circuit manufacturing system to manufacture the apparatus.

There may be provided an integrated circuit manufacturing system comprising:
- a non-transitory computer readable storage medium having stored thereon a computer readable integrated circuit description that describes an apparatus described herein;
- a layout processing system configured to process the integrated circuit description so as to generate a circuit layout description of an integrated circuit embodying the apparatus; and
- an integrated circuit generation system configured to manufacture the apparatus according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF DRAWINGS

The present invention will now be described by way of example with reference to the accompanying drawings. In the drawings.

DETAILED DESCRIPTION

The present application is directed to an approach for calibrating a camera in order to calculate calibration data for a set of camera parameters. The calibration parameters can be calculated for a sequence of images acquired from a camera, wherein the calibration parameters can change between images of the sequence. Under the approach described herein, two separate calibration stages are performed. A first of the calibration stages may be an initial calibration performed on frames of a sequence captured by the camera in order to calculate initial calibration data for those frames. As will be described in more detail below, the first calibration stage may be performed in real-time, and may be performed on each frame of the sequence. The second calibration stage is a further calibration performed on selected frames of the sequence in order to calculate refined calibration data for those selected frames. The second calibration stage may be used to obtain more accurate calibration data for the selected frames (compared to the approximate calibration data obtained for those frames from the first stage), and as such might not be performed in real-time. The refined calibration data is used in the first calibration stage for subsequent frames of the sequence. In this way, accurate calibration data for historic frames of the sequence can be used to improve the accuracy of the first calibration stage performed on subsequent frames of the sequence. The initial calibration data for a selected frame is also used in part of the second calibration stage for that frame. The use of the initial calibration data for the selected frame may improve the speed and/or accuracy of the second calibration stage.

Figure 1:
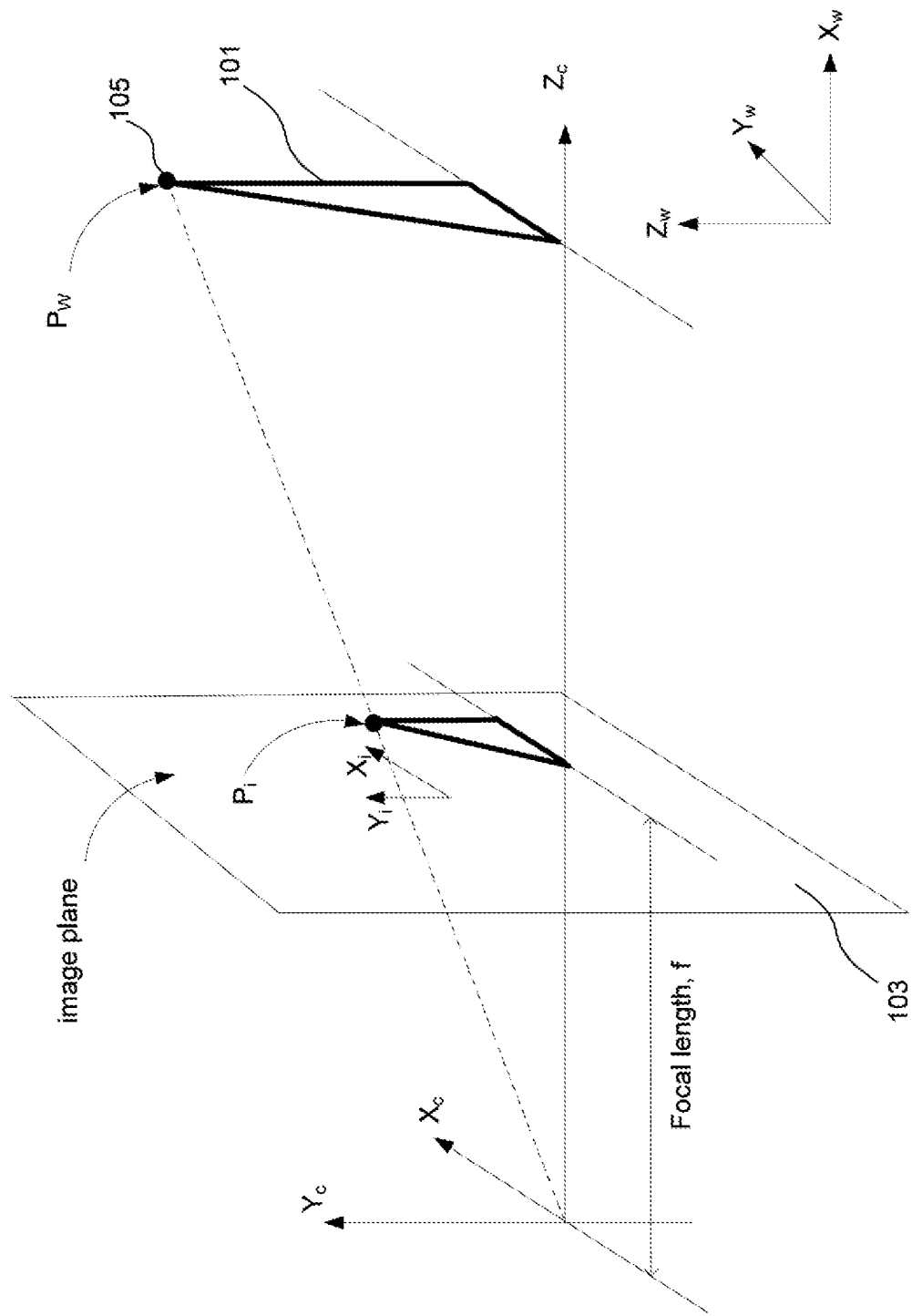
FIG. 1 is a schematic illustration of the relationship between a world coordinate frame for a scene and an image plane frame.
Figure 2:
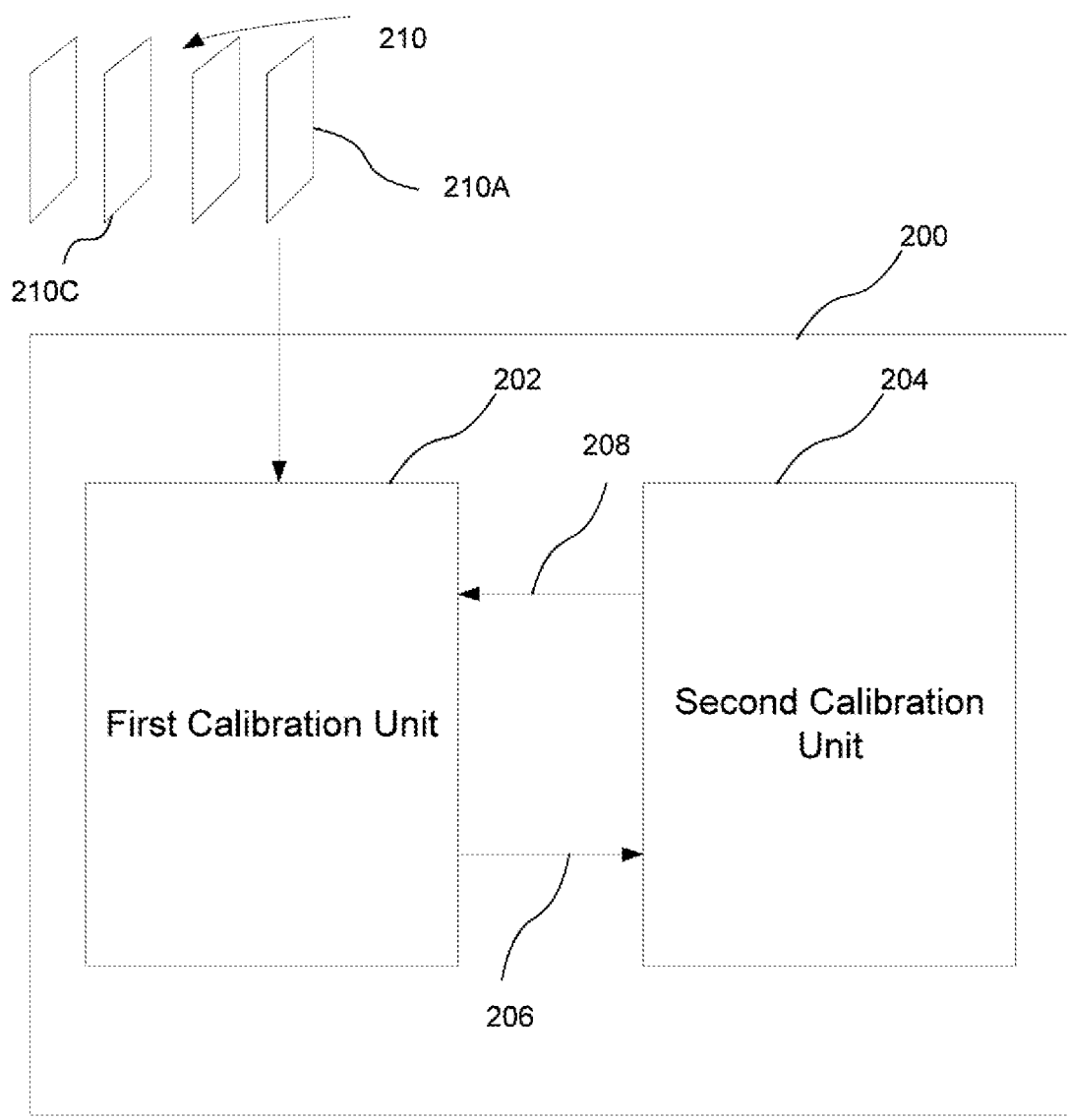
FIG. 2 shows an apparatus for calculating calibration data for a camera.

An apparatus for calibrating a camera is shown in FIG. 2. The apparatus 200 comprises a first calibration unit 202 and a second calibration unit 204. The first and second calibration units are coupled by communication buses 206 and 208 to permit the transfer of data therebetween.

The first and second calibration units may be implemented on or as part of separate processing units. For example, the first calibration unit may be implemented as part of a graphics processing unit (GPU) and the second calibration unit may be implemented as part of a central processing unit (CPU).

The first calibration unit 202 is configured to perform a first calibration for frames of a sequence 210 captured by a camera (not shown). The first calibration unit 202 performs the calibration to calculate for the frames of the sequence first calibration data for a set of one or more camera parameters. The first calibration data may comprise a set of values for the respective camera parameters. That is, each value may correspond to a respective camera parameter.

The camera parameters may comprise one or more extrinsic and/or intrinsic parameters of the camera. Extrinsic parameters may include the camera's position and/or orientation with respect to a scene being imaged by the camera. The combination of the camera's position and orientation with respect to a scene may be referred to as the camera's pose. The set of extrinsic parameters may define the location and/or orientation of a camera reference frame with respect to a world reference frame. The world reference frame may define the positions of objects in the scene. The camera reference frame may have as its origin the optical centre of the camera. In this way, the camera can be said to define the camera reference frame. Both the world reference frame and the camera reference frame may be 3-D coordinate systems, in which case the extrinsic parameters may represent a rigid transformation from a 3D world coordinate system to the 3D camera's coordinate system.

The intrinsic parameters of the camera may include the camera's focal length (the distance between the optical centre of the camera and the image plane), optical centre, and pixel skew coefficients. In general, the intrinsic parameters may link, or map, a coordinate (or position) in the camera reference frame to a corresponding coordinate/position in the image plane. That position in the image plane may be a pixel position. Thus, the intrinsic parameters may represent a projective transformation from the camera's 3D coordinate system to 2D image coordinates.

The first calibration unit 202 may calculate values for one or more camera parameters. Thus the calibration unit 202 may calculate values for the set of extrinsic parameters, the set of intrinsic parameters, or both. Alternatively, the calibration unit 202 may calculate values for a mixed subset of intrinsic and extrinsic parameters. Each of the set of one or more camera parameters may be denoted i. The values for the set of one or more camera parameters determined by the first calibration unit 202 may take the form of a vector, or matrix. These vectors or matrices may be referred to as calibration vectors or calibration matrices respectively. Each element of the calibration vector or calibration matrix may correspond to a respective camera parameter, with the value of each element denoting the value for that particular parameter as determined by the first calibration unit 202. Alternatively, several elements of the calibration vector or calibration matrix may, in combination, correspond to a single camera parameter, and any one element of the calibration vector or calibration matrix may correspond to more than one camera parameter. For example, a calibration vector may contain three elements, each element specifying a rotation of the camera about a respective axis. The rotational position of the camera about each axis may correspond to a respective camera parameter. Alternatively, the rotational position of the camera about an axis may be expressed using a matrix, in which case multiple elements of the matrix may describe one camera parameter.

The second calibration unit 204 is configured to calculate second calibration data for selected frames of the sequence in dependence on the first calibration data for those frames calculated by the first calibration unit 202. The second calibration unit may calculate the second calibration data for the same set of camera parameters as the first calibration unit. Alternatively, the second calibration unit 204 may calculate the second calibration data for only a subset of the camera parameters calculated by the first calibration unit. The second calibration data may take the form of a calibration vector, or calibration matrix. Again, each element of the calibration vector or calibration matrix may correspond to a respective camera parameter, with the value of those elements denoting the value of the respective parameter as determined by the second calibration unit. Alternatively, several elements of the calibration vector or calibration matrix for the second calibration data may, in combination, correspond to a single camera parameter, and any one element of the calibration vector or calibration matrix may correspond to more than one camera parameter, as described above.

In examples described herein, the second calibration unit only performs the second calibration on selected frames for which a first calibration has been performed. Thus, the second calibration unit 204 calculates calibration data for a reduced number of frames of the sequence 210 compared to the first calibration unit 210.

The second calibration unit 204 communicates the second calibration data for the selected frames back to the first calibration unit (in this example via bus 208). The first calibration unit 202 then uses the second calibration data when performing the first calibration for subsequent frames of the sequence 210, i.e. frames in the sequence subsequent to those selected frames.

For example, the first calibration unit 202 receives frame 210A of the sequence 210. The first calibration unit calculates first calibration data for a set of camera parameters (e.g. camera position, orientation, focal length, etc.) for frame 210A. The first calibration unit 202 then selects frame 210A for further processing on the basis of its first calibration data and communicates the selected frame 210A and its first calibration data to the second calibration unit 204. The second calibration unit 204 then calculates second calibration data for the selected frame 210A. The second calibration data can be calculated using, or in dependence on, the first calibration data for that frame. The second calibration unit 204 then communicates the second calibration data for the selected frame 210A back to the first calibration unit 202. The first calibration unit 202 then uses the second calibration data for frame 210A to perform the first calibration for a subsequent frame of the sequence 210 (e.g. frame 210C). It will be appreciated that the first calibration for frame 210A may itself have been performed using second calibration data for an historic frame of the sequence (i.e. a frame that occurred in the sequence prior to frame 210A).

One convenient implementation is to split the calibration process so that the first calibration performed by the first calibration unit 202 is of a lower accuracy than the second calibration performed by the second calibration unit 204. Thus the first calibration unit may perform an initial, or approximate (i.e. "coarse"), calibration on frames of the sequence to calculate initial (or approximate) calibration data, and the second calibration unit may perform a further calibration to calculate refined, or re-estimated, calibration data.

For example, the first calibration performed by unit 202 may comprise an incremental calibration. To perform the incremental calibration, the first calibration unit 202 may calculate estimated calibration data for a given frame (e.g. frame 210C) from the first calibration data for only a single previous frame of the sequence (e.g. frame 210A). In contrast, the second calibration performed by the calibration unit 204 may calculate calibration data for a given frame of the sequence (e.g. frame 210A) from the calibration data for a plurality of previous frames of the sequence. These previous frames may be limited to only previously selected frames, i.e. previous frames that were selected by the first calibration unit 202 for further calibration. Alternatively, the second calibration data for a frame of the sequence may be calculated from the calibration data for a plurality of previous frames that includes a combination of selected and non-selected frames (i.e. a combination of frames that were selected by the first calibration unit 202 for further calibration and frames that were not selected by the first calibration unit 202 for further processing). The calibration data of the previous frames may comprise the first and second calibration data for those frames; or it may be limited to only the second calibration data for those frames. In one example, the second calibration unit 204 may use a combination of the refined calibration data and the approximate calibration data for the plurality of previous frames. The calibration performed by the second calibration unit 204 may be a non-linear calibration. For example, the second calibration data for a given frame of the sequence may be calculated from a weighed combination of calibration data for previously selected frames of the sequence.

The difference in accuracy between the two calibration units may also mean that the first calibration unit 202 processes frames at a higher frequency than the second calibration unit 204. The first calibration unit may perform the initial calibration on frames of the sequence at substantially the same frequency as that at which the frames of the sequence are received by the apparatus, or captured by the camera. As such, the first calibration unit may perform a 'real-time' initial calibration on frames of the sequence. The first calibration unit 202 could for example perform the first calibration on the frames at a rate of at least 24 frames per second (fps). In some cases, it may process the frames at a rate of 30 fps.

In contrast, the second calibration unit may perform the second calibration at a lower frequency (e.g. frame rate) than the first calibration unit. For example, the second calibration unit may perform the second calibration at a rate of approximately 0.4 fps. As such, the second calibration unit may be said to perform a non-real time calibration (i.e. the rate at which the second calibration unit performs the second calibration is less than the rate at which frames are received at the apparatus).

The first calibration unit 202 may use the second calibration data for a selected frame (e.g. frame 210A) to apply a correction to estimates of the calibration data calculated as part of the first calibration for a subsequent frame of the sequence (e.g. frame 210C). The first calibration unit may determine this correction from a comparison of the first calibration data for that selected frame and the second calibration data for that same selected frame as received from the second calibration unit. When the first calibration unit 202 sends a selected frame to the second calibration unit 204, the first calibration unit 202 stores a copy of the first calibration data for the selected frame. The first calibration unit 202 may need to know which historic frame the second calibration data received from the calibration unit 204 corresponds to. In order to do this, the second calibration unit 204 may communicate an indication of, or identifier for, the selected frame along with the second calibration data for that frame. The indication could for example be the frame number of the selected frame. The first calibration unit could then use the frame identifier to access the stored first calibration data for that frame in order to determine the correction to apply to its calibration estimates.

The first calibration unit 202 may perform the first calibration for each frame of the sequence 210, i.e. it may be a per-frame calibration. However, the first calibration need not perform the first calibration on every frame but may for example perform the first calibration on one frame in each group of N frames of the sequence, where N≥2.

The first calibration unit may select the frames for further calibration by the second unit 204. It may do this in dependence on the first calibration data for the frames and/or in dependence on metadata associated with the frames. The metadata could include, for example, indications of picture quality, or picture sharpness. Alternatively, the first calibration unit may be configured to select one frame in each group of M frames of the sequence for further calibration independently of the first calibration data and image metadata, where M>N.

Splitting the calibration process into two parts—an initial calibration stage and a more accurate, or refined calibration stage—allows the accuracy of the initial calibration to be improved (using the results of the more accurate second calibration) without adversely affecting the processing speed of the initial calibration. Further, by communicating the first calibration data to the second calibration unit, the accuracy and/or speed of the refined calibration may be increased.

One convenient implementation of the apparatus 200 is to implement the first calibration unit 202 on, or as part of, a graphics processing unit (GPU) or other specialized hardware, and to implement the second calibration unit 204 on, or as part of, a central processing unit (CPU). This is advantageous because a GPU is typically configured to perform operations within a time-constrained environment, and within a tighter power budget than can be achieved with a CPU.

The calibration apparatus shown in FIG. 2 is suitable for calculating any camera parameter used as part of camera calibration. As such, the apparatus in FIG. 2 is capable of being implemented in a variety of applications. An example of one such application is for generating panoramic images from an input video stream comprising a sequence of frames.

Figure 3:
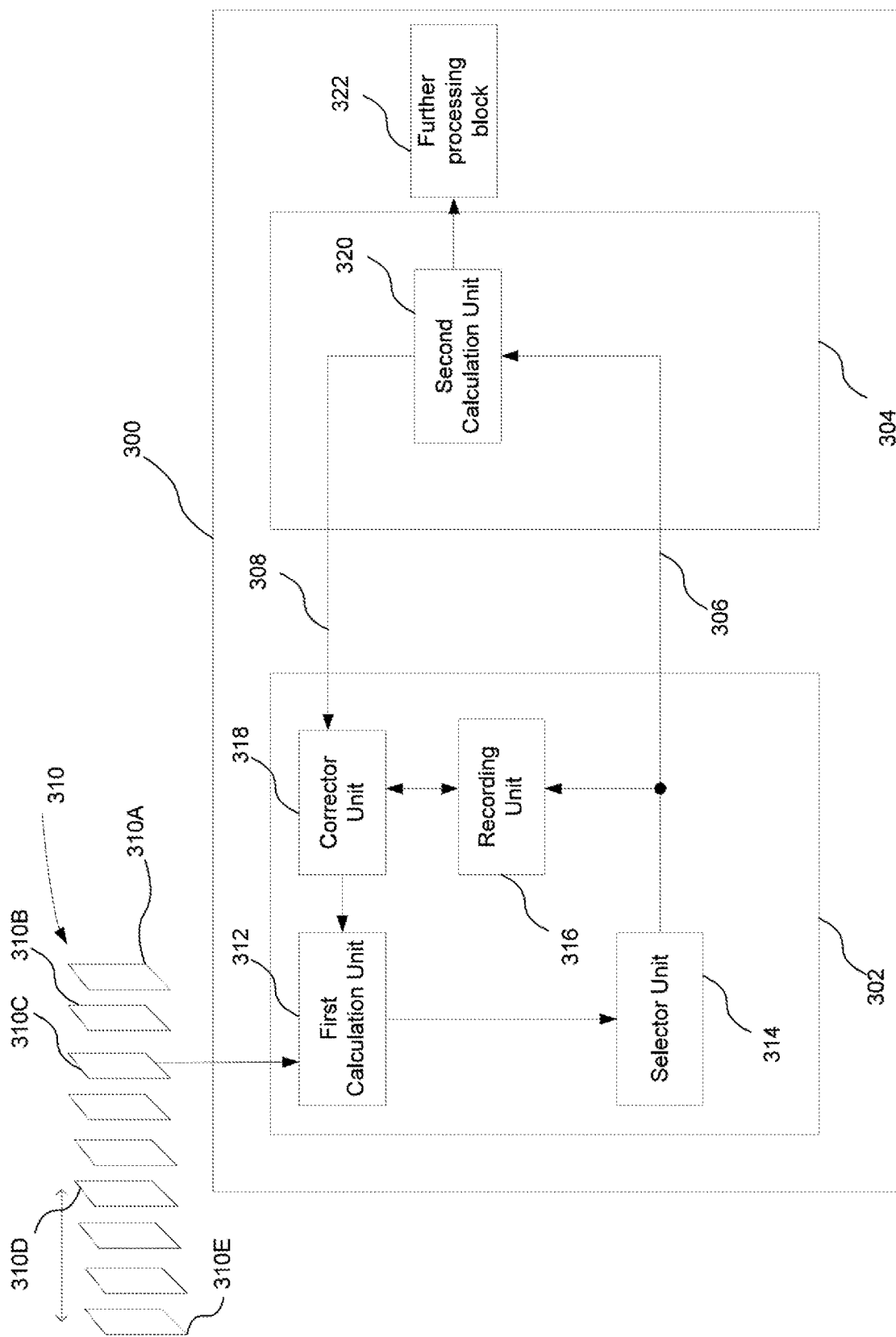
FIG. 3 shows an example apparatus for calculating calibration data for a camera for use in generating a panoramic image.

An example apparatus for calculating calibration data for use in generating a panoramic image from a sequence of frames is shown in FIG. 3.

The apparatus is indicated generally at 300 and comprises a first calibration unit 302 and a second calibration unit 304.

The first and second calibration units are coupled by communication buses 306 and 308. The sequence of frames is indicated generally at 310. The sequence of frames has a processing order, and in this example is such that the frames are processed in order of right to left so that frame 310A is processed before frame 310B; frame 310B is processed before frame 310C etc. Each frame may depict an image (as captured by the camera) at a particular time instant and so be referred to as an image frame.

The first calibration unit 302 comprises a first calculation unit 312, a selector unit 314, a recording unit 316 and a corrector unit 318. The calculation unit 312 is coupled to the selector unit 314 so that the output of the calculation unit 312 is fed as an input to the selector unit 314. The output of the selector unit is coupled to an input of the recording unit 316. The recording unit 316 is coupled to the corrector unit 318. In particular, an input/output (I/O) interface of the recording unit is connected to an I/O interface of the corrector unit. An output of the corrector unit 318 is also coupled to an input of the calculation unit 312.

The first calibration unit 302 is configured to receive frames of the sequence 310 and to perform a first calibration on those frames to calculate first calibration data for a set of one or more camera parameters. As described above, the calibration unit 302 may perform the first calibration on each frame of the sequence 310. It may perform the first calibration in real time. In this example, the first calibration unit is configured to perform an incremental calibration as part of calculating the first calibration data for a frame.

The second calibration unit 304 comprises a second calibration calculation unit 320. The second calibration calculation unit 320 is coupled to the selector unit 314 via bus 306. More specifically, an output of the selector unit is coupled to an input of the second calculation unit 320. The second calculation unit 320 is also coupled to the corrector unit 318. In particular, an output of the second calculation unit is connected to an input of the corrector unit by bus 308.

The second calibration unit 304 is configured to perform a refined, or re-calculated calibration for selected frames of the sequence. It performs a more accurate calibration than the first calibration unit. It may for example perform a non-linear calibration. It may perform a global calibration for a selected frame using the calibration data for all frames of the sequence prior to that selected frame. Alternatively, it may calculate second calibration data for a selected frame using the second calibration data for a plurality of previous selected frames of the sequence.

The operation of the apparatus 300 will now be described with respect to the processing of frame 310C of the sequence.

The first calibration unit receives frame 310C. The frame 310C is received by the calculation unit 312, which calculates an estimate of the values for the set of camera parameters for that frame. Because the first calibration unit 302 performs an incremental calibration, the calculation unit 312 estimates the set of camera parameters for frame 310C using the calibration data for only a single previous frame of the sequence (in this example frame 310B). More generally, a previous frame is one that has been processed, or captured, prior to the frame 310C.

The corrector unit 318 calculates a correction to the estimated parameters. That correction is calculated from the refined calibration data for an historic frame of the sequence (in this example frame 310A). The calculation of the correction will be described in more detail below.

The calculation unit 312 applies the correction from the corrector unit 318 to its parameter estimates for frame 310C to calculate first, or initial, calibration data for frame 310C. Thus, the first calibration data for frame 310C is calculated from: i) an estimate of the set of camera parameters determined from an incremental calibration; and ii) a correction determined by the corrector unit from refined calibration data for a previous frame of the sequence. That is, in this example the calculation unit 312 performs an incremental calibration for the frame 310C to estimate the set of camera parameters for that frame, and then accumulates to those estimates the correction determined by the corrector unit 318.

In an alternative example, the correction determined by the corrector unit 318 may be incorporated into the incremental calibration performed by the calculation unit 312. That is, rather than the incremental calibration and correction being performed accumulatively as separate steps to generate the first calibration data for a frame, the calculation unit 312 may calculate the first calibration data for a frame by performing an incremental calibration that is dependent on a correction determined by the corrector unit 318. This may enable the first calibration data for a frame to be determined in a single processing step.

The calculation unit 312 may additionally calculate, or record, other image information for the frame 310C. For example, it may determine the frame number of the frame in the sequence and/or an image parameter indicative of the quality of the image depicted by the frame, such as an indication or measure of image sharpness. This additional frame information may be referred to as frame metadata.

The calculation unit 312 communicates the first calibration data for frame 310C and the frame metadata to the selector unit 314. The selector unit 314 selects frames for further calibration in dependence on the first calibration data and metadata for those frames.

In this example, where the apparatus is performing camera calibration as part of the construction of a panoramic image, the selector unit may select frames for further calibration by the second calibration unit that have first calibration data and metadata that indicates that the frame is suitable for generating a panoramic image. For instance, when constructing a panoramic image, it may be desirable to select frames that are approximately n degrees apart (e.g. 20 degrees apart) in terms of the angle within the scene at which the frames are captured. The angle, or orientation of the frames can be determined from the extrinsic parameters of the camera (in particular, its orientation). Thus, the selector unit may select frames for further calibration that have first calibration data indicative of an approximate angular displacement from the previously selected frame. The selection of the frame may be further subject to the condition that the image quality of the frame is above a certain threshold, for example that the image sharpness is above a certain threshold. This may avoid a frame having a poor image quality from being selected for inclusion in the panoramic image.

Returning to our example, the selector unit 314 identifies the frame 310C as being suitable for further calibration.

The selector unit 314 communicates an identifier of the frame 310C and its associated first calibration data to the recording unit 316. The frame identifier could for example be the frame number, which may be obtained from the metadata for the frame. The recording unit 316 then records, or stores, the frame identifier and first calibration data for frame 310C. The recording unit may store the data in a memory. The memory could be a local memory to the first calibration unit, e.g. a register or cache. If the first calibration unit 302 was implemented as part of a GPU, the recording unit could record the data in the GPU's cache.

The selector unit 314 further communicates the frame 310C and its associated first calibration data and metadata to the second calibration unit 304. The frame 310C, its associated first calibration data and metadata are received by the second calculation unit 320.

The second calculation unit 320 calculates second calibration data for the frame 310C. The second calculation unit 320 may re-estimate or refine the first calibration data to generate the second calibration data. As described above, the second calculation unit may perform a non-linear calibration using the calibration data for a plurality of previous frames of the sequence (i.e. frames of the sequence prior to frame 310C). The second calculation unit could perform the second calibration using the second calibration data for a plurality of previously selected frames (i.e. a previous set of frames processed by the second calibration unit 304). Alternatively, the second calculation unit could perform the second calibration using the first and second calibration data for a subset of previous frames of the sequence.

Because the second calculation unit 320 performs a more 'global' calibration using the calibration data for a plurality of previous frames, it is less likely to suffer from calculation errors, such as a drift in the camera's position or orientation, that may result from the incremental nature of the calibration performed by the first calibration unit.

The calculation unit 320 then communicates the refined calibration data for frame 310C to a further processing block 322.

In this example the further processing block 322 may be configured to generate the panoramic image from the set of selected frames and associated refined calibration data. The selected frames may be communicated to the processing block from the calculation unit 320. For example, the image data for the selected frames and the refined calibration data for those respective frames may be communicated together from the calculation unit 320 to the further processing block 322. Alternatively, once the selected frames have been determined by the selector unit 314, they may be stored in a store. That store could be external of the calibration units 302 and 304. The selected frames could then be retrieved from the store by the block 322. In this case, the refined calibration data for a selected frame may be associated with an indication of that selected frame (e.g. a frame ID). The block 322 could then use the frame indication associated with the refined calibration data to select the correct frame from the store.

The processing block 322 may generate the panoramic image by stitching the set of selected frames together. To do this, the processing block 322 may use the refined calibration data for each of the selected frames to warp those frames into a common space. Warping the frames into a common space brings the frames into alignment (e.g. so that features on one edge of a frame are aligned with features on the opposing edge of another frame), so that they may be blended. Once the block 322 has warped the frames into a common space, the block may determine a join seam between adjacent frames to enable the frames to be blended. The block 322 may also perform colour balancing on the frames prior to those frames being blended.

The processing block may stitch sequential selected frames together as they are received (from the second calibration unit 304; a store, or elsewhere). Alternatively, the processing block 312 may hold the received selected frames in a buffer until the set of frames required for the panoramic image are received before stitching the set of frames together.

The processing block 322 could be implemented on a CPU or a GPU. Alternatively, the processing block could be split across both the CPU and the GPU. For instance, the steps of frame warping and blending may be well suited to being performed by the GPU, whereas the step of identifying the join seam may be suitably performed by the CPU.

The second calculation unit 320 also communicates the refined calibration data for the frame 310C back to the first calibration unit 302. This refined calibration data is received by the corrector unit 318.

Because the first calibration unit 302 performs frame calibration at a higher rate, or processing speed, than the second calibration unit 304, the first calibration unit will be performing the first calibration on a subsequent frame of the sequence to frame 310C when the refined calibration data for frame 310C is received from the second calibration unit (e.g. frame 310D).

The corrector unit 318 therefore uses the refined calibration data for the previously selected frame 310C to calculate a correction to be applied to the calibration data estimated by the first calculation unit 312 for subsequent frames of the sequence (i.e. frames of the sequence subsequent to that previously selected frame 310C). In this example, the first calibration unit is processing the subsequent frame 310D when the second calibration data for frame 310C is received from the second calibration unit.

To calculate the calibration correction, the corrector unit 318 compares the refined calibration data for frame 310C with its initial calibration data for frame 310C (as previously calculated by the first calculation unit 312 and stored in the recording unit 316). To do this, the corrector unit may additionally receive the identifier for frame 310C from the second calibration unit. The corrector unit can use the frame identifier to access the first calibration data for frame 310C that was previously stored by the recording unit 316.

The correction could be calculated in a number of ways, but in one implementation the correction is equal to the difference between the first calibration data and second calibration data for the frame (frame 310C) for each of the set of camera parameters. That is, the correction may comprise a set of correction values for the set of the camera parameters. Mathematically, the corrector unit could be said to calculate a set of correction values $\Delta v_i$ for each camera parameter i, where $\Delta v_i$ represents the difference in value between the first and second calibration data for parameter i. The set of correction values may take the form of a vector or matrix, which may be referred to as a correction vector or correction matrix respectively. Each element of the correction vector or correction matrix may denote the correction value for a respective camera parameter.

The corrector unit 318 then communicates the correction values to the first calculation unit 312.

The first calculation unit 312 uses the correction values to apply a correction to its estimate of the calibration data for frame 310D to thereby calculate the set of first calibration data for frame 310D. In this way, any errors in the calibration data that may accumulate as a result of the incremental calibration performed by the first calibration unit can be corrected. This reduces drift in the calibration data for the camera parameters from their true, or correct values.

The first calculation unit 312 may apply the correction to the estimated calibration data for frame 310D in a number of ways. For example, the first calculation unit 312 may apply each correction value $\Delta v_i$ to the estimated value for parameter i determined for frame 310D using an additive operation. If the correction values are in the form of a correction vector or matrix, the first calculation unit may apply the correction by adding the correction vector/matrix to the calibration vector/matrix determined by the first calculation unit for frame 310D. As another example, the set of correction values determined by the corrector unit 318 may be multiplicative. In this case, the first calculation unit 312 may apply the correction values using a no multiplicative operation. If the first calibration data is in the form of a vector, and the correction values are in the form of a matrix, for example, the first calculation unit 312 may apply the correction by performing a multiplication of the calibration vector by the correction matrix. If the correction values and first calibration data are both in the form of a matrix, the first calculation unit 312 may apply the correction by performing a matrix multiplication of the correction matrix and the calibration matrix.

The first calculation unit 312 may apply the correction in its entirety to the estimated calibration data for frame 310D. That is, if the corrector unit 318 calculates a correction $\Delta v_i$ for the camera parameter i, the first calculation unit may apply that correction $\Delta v_i$ to the estimated value of camera parameter i for frame 310D. In other words, the corrector unit 318 may apply the correction determined from the second calibration data for a selected frame (e.g. frame 310C) to an estimate calculated as part of the first calibration for only a single frame of the sequence (e.g. frame 310D) subsequent to that selected frame.

Alternatively, the first calculation unit may apply the correction incrementally across a plurality of frames subsequent to the selected frame. In other words, the first calculation unit may spread the correction over a plurality of frames. That is, the calculation unit 312 may apply a correction determined from the second calibration data for a selected frame (e.g. frame 310C) incrementally to estimates of the camera parameters for a sequence of frames subsequent to that selected frame. For example, the calculation unit may apply a correction $\Delta v_i$ for parameter i incrementally across the sequence of frames 310D-E. Thus the correction amount is applied gradually across a plurality of subsequent frames of the sequence.

Whether the calculation applies the correction immediately to the parameter estimates for a single frame or gradually to the parameter estimates for a plurality of frames may depend on the implementation of the calibration apparatus. In this example, where the apparatus is calculating calibration data for frames for generating a panoramic image, it has been found that better results may be achieved by applying the corrections immediately.

If the corrections are to be applied gradually, they could be applied across a number of frames such that the correction has been fully applied by the time the corrector unit 318 receives the second calibration data for the next selected frame of the sequence from the second calibration unit 304. That is, if the first calibration unit 302 performs the first calibration at a rate of m frames-per-second, and the second calibration unit performs the second calibration at a rate of n frames-per-second, where m>n, then the calculation unit 312 may apply a correction from the corrector unit 314 across a number of frames $n_{frames} \leq m/n$. However, this need not be the case. The calculation unit 312 may for example apply the corrections across a variable number of frames. That is, different corrections may be applied across different numbers of frames. One implementation in which this might occur is if the calculation unit 312 applies a fixed amount of correction to each subsequent frame. It follows that in such an implementation, if the size of the correction to be applied varies, the number of frames across which a correction is applied also varies (e.g. because the calculation unit spreads a relatively large correction across a greater number of frames than a relatively small correction). If the number of frames across which the calculation unit 312 applies a correction is variable (e.g. because it's dependent on the size of the correction to be applied), then the calculation unit 312 may apply the corrections so that the average number of frames over which a correction is applied is less than or equal to m/n. Applying the corrections in this way enables all the corrections determined by the corrector unit 318 to be applied across the sequence of frames 310 and can avoid the build-up of a backlog of corrections.

It will be appreciated that although the operation of the apparatus 300 has been described primarily with reference to frame 310C, the apparatus operates in an analogous manner for subsequent frames of the sequence 310.

In another example implementation, the calibration apparatus may calculate calibration data for use in generating images within an augmented reality application.

An augmented reality application may operate to augment, or supplement, an image of a real-world environment captured by a camera with generated video, or graphical content. In order for the augmented reality application to generate a convincing image for display, it is useful for the application to know where to place the augmented content within the real-world image captured by the camera. For example, if the application operates to place an item of furniture within a real-world scene, a more convincing image will be generated if the furniture item is placed within a feasible, or expected position within that scene (e.g. with the base of the furniture item resting on the floor). In order to correctly locate the content item within the scene, it is useful for the application to know the position and/or orientation of the camera with respect to that scene (i.e. the camera's extrinsic parameters). It may also be useful for the application to know any or all of the camera's intrinsic parameters (e.g. the focal length) so that the content item can be projected into the scene at an appropriate size and with an appropriate distortion.

Figure 4:
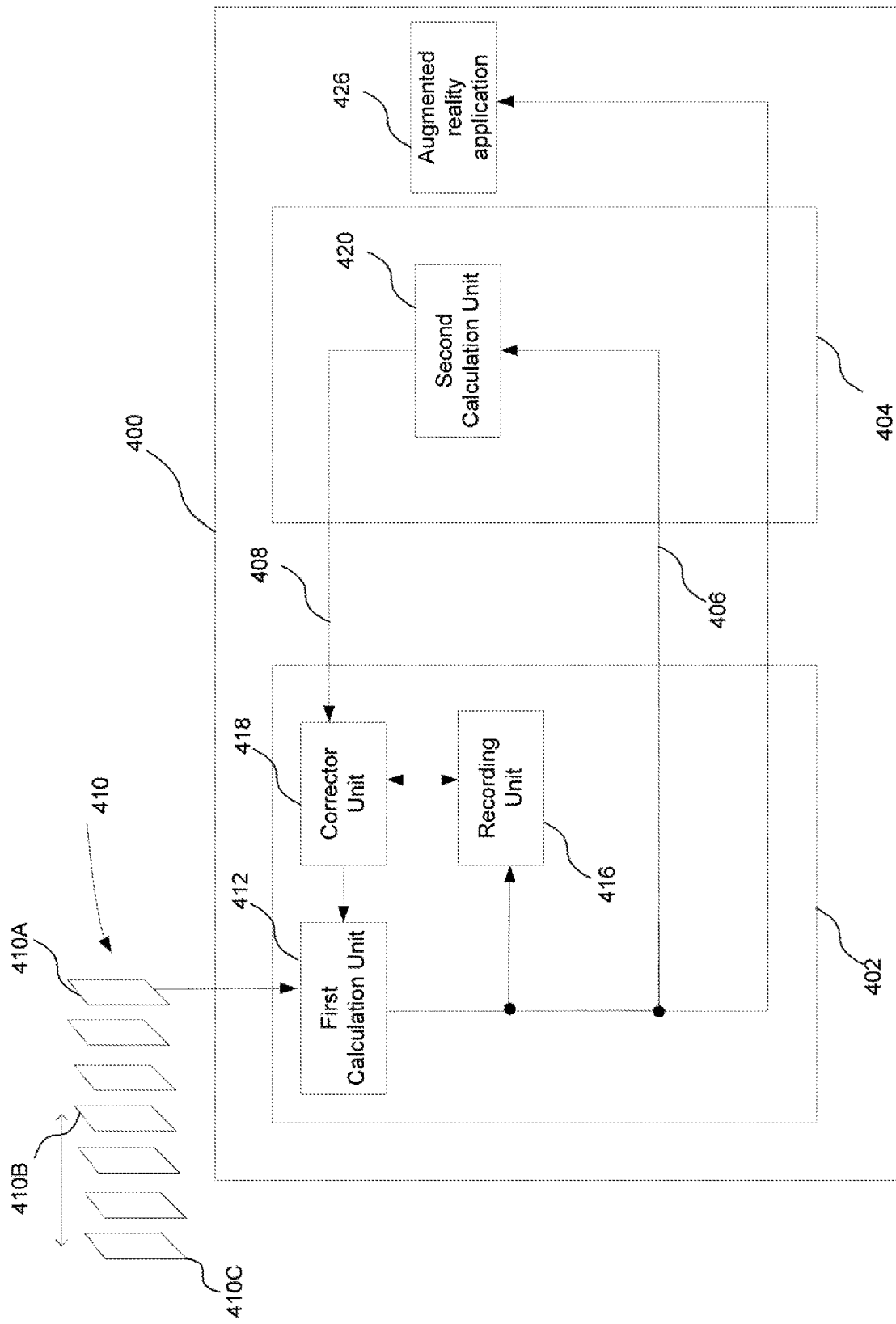
FIG. 4 shows an example apparatus for calculating calibration data for a camera for use in generating an augmented reality image.

FIG. 4 shows an example of an apparatus 400 for calculating camera calibration data for frames of a sequence for generating augmented reality images.

The apparatus again comprises a first calibration unit 402 and a second calibration unit 404. The calibration units are connected to each other by communication buses 406 and 408. The first calibration unit 402 comprises a first calculation unit 412, a recording unit 416 and a corrector unit 418. The second calibration unit 404 comprises a second calibration calculation unit 420, and is coupled to an augmented reality application 426.

The first calibration unit 402 is configured to calculate calibration data for a frames of the sequence 410 captured by a camera (not shown).

The calculation unit 412 receives a frame of the sequence (e.g. frame 410A) and calculates for that frame a set of first calibration data for a set of one or more camera parameters. In this example, the set of camera parameters include the camera's position, orientation and focal length.

The first calculation unit also records an identifier for the frame (e.g. the frame number).

In this example, the first calibration unit does not include a selector unit to select frames for further calibration by the second calibration unit. Instead, the first calibration unit is configured to periodically select a frame for further calibration, e.g. by selecting one frame in every N frames of the sequence 410 for further calibration. That is, every $N^{th}$ frame of the sequence is selected for further calibration.

Thus the recording unit 416 records the first calibration data and frame identifier of every $N^{th}$ frame. Again, the recording unit may store this information in a memory or cache local to the first calibration unit.

The first calibration unit 402 communicates every $N^{th}$ frame (i.e. one frame in every N frames), the frame identifiers for those frames and the first calibration data for those frames to the second calibration unit 404 over bus 406, and in particular to the second calculation unit 420.

The second calculation unit 420 performs a second calibration on the selected frames to calculate second calibration data. The second calibration is a non-real time calibration that corrects for errors in the values of the camera parameters, such as positional drift, or other errors arising from the incremental nature of the calibration.

In this example, the first calibration unit 412 passes the first calibration data for the frames to the augmented reality application 426. The second calibration unit 420 does not pass the second calibration data to the augmented reality application 426, but instead only generates second calibration data for selected frames that is used by the first calibration unit to apply corrections to the approximate calibration data generated by that unit. Arranging the calibration apparatus 400 so that the augmented reality application 426 receives only first calibration data and not second calibration data assists the application 426 in providing a real-time output display. This is because of the faster rate at which the first calibration data is calculated compared to the second calibration data. As indicated above, the augmented reality application uses the calibration data to map the environment captured in the frames in order to insert content items into that environment.

The augmented reality application 426 may be implemented in the GPU or CPU. It may be implemented across both the CPU and GPU.

The second calculation unit communicates the second calibration data for a selected frame (e.g. frame 410A) and the frame identifier for that frame back to the first calibration unit 402 via bus 408, and in particular to the corrector unit 418. The corrector unit 418 uses the received frame identifier to access the first calibration data for the frame 410A. The corrector unit then compares the second calibration data and the first calibration data for that frame to determine a correction for one or more camera parameters. The correction may therefore comprise a set of correction values corresponding to respective camera parameters.

The correction is communicated to the first calculation unit 412, which is now estimating the calibration data for a subsequent frame 410B of the sequence 410. The first calculation unit applies the correction incrementally across a plurality of sequential subsequent frames of the sequence (i.e. to a set of frames, each frame of the set being subsequent to the frame 410A). In this example, that set of frames includes frames 410B-410C. It has been found that applying the correction in camera parameters incrementally across multiple subsequent frames of the sequence is more effective than applying the correction to a single frame when calculating calibration data for the purposes of generating augmented reality images. This is because incremental corrections in the camera parameters (which may for example manifest in the sequence of images generated by the application 426 as a drift in the position of an augmented content item within the image) tend to be less noticeable to users than applying a correction to a single frame (which may result in an augmented content item undergoing a sharp change in position between a pair of consecutive images generated by the application 426). However, it would be possible for the first calculation unit 412 to apply the correction to a single frame.

Other implementations of the techniques described herein are also possible, for example within a 3-D scene reconstruction system, a robotic system, or within a stereo camera system. More generally, the techniques described herein are applicable to a general camera tracking system.

Figure 5:
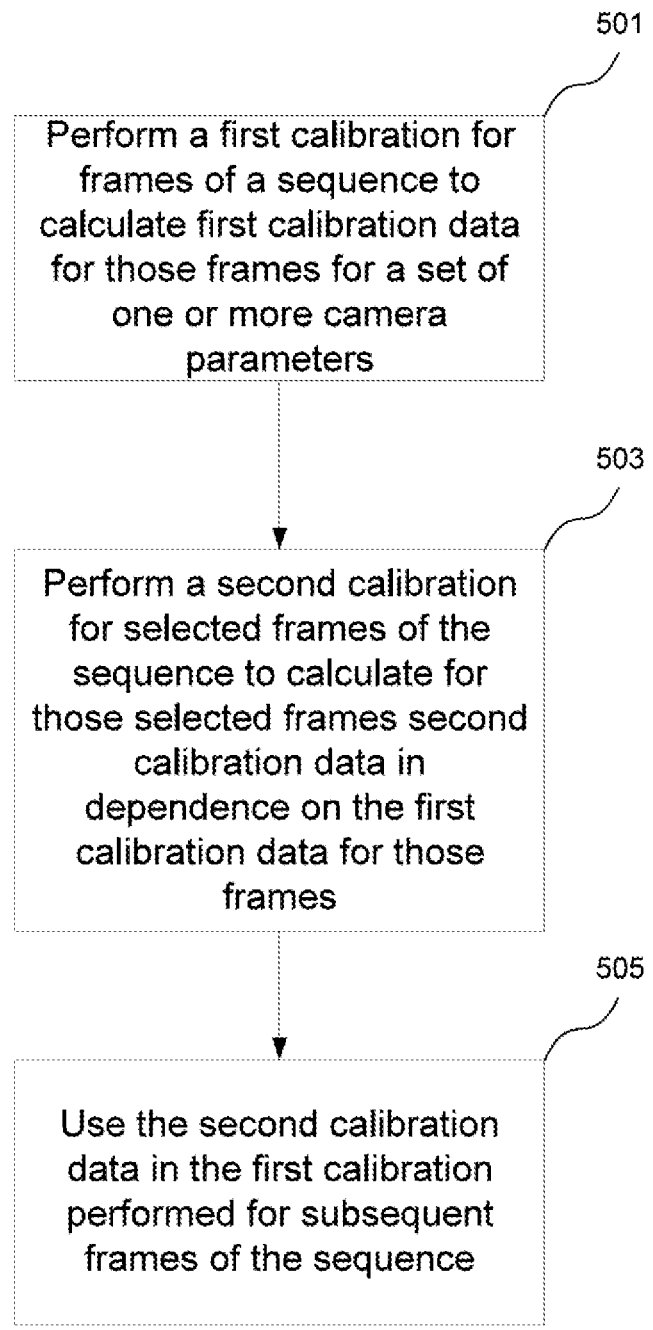
FIG. 5 shows a flowchart of steps for calculating calibration data for a camera.

A method of calibrating a camera using the techniques described herein is outlined in FIG. 5 and will be referred to in the following paragraphs.

At step 501, a first calibration for frames of a sequence captured by a camera is performed to calculate for those frames first calibration data for a set of one or more camera parameters.

The first calibration data may be performed on each frame of the sequence. It may be performed in real-time. It may comprise an incremental calibration, meaning that the calibration data is calculated using the calibration data for a single previous frame only. The first set of calibration data may comprise a plurality of values for a respective one of the set of camera parameters. The first calibration data may be an initial, or approximate, calibration.

At step 503, a second calibration for selected frames of the sequence is performed to calculate for those selected frames second calibration data in dependence on the first calibration data for those frames.

The frames may be selected in dependence on their first calibration data. Alternatively, the frames may be selected independently of their first calibration data, e.g. periodically so that one frame in every N frames of the sequence is selected. The second calibration may be a non-real time calibration. It may calculate calibration data for the same set of camera parameters as the first calibration. It may be a refined, or more accurate calibration than the first calibration. For example, the second calibration may be performed using calibration data for a plurality of previous frames.

At step 505, the second calibration data is used in the first calibration performed for subsequent frames of the sequence. That is, the second calibration data for selected frames is used in the first calibration performed for frames subsequent to those selected frames in the sequence.

The second calibration data may be used to calculate a correction to be applied when calculating the first calibration data for the subsequent frames. The correction may comprise a plurality of correction values corresponding to respective camera parameters. The correction may be determined from a comparison of the second calibration data for a selected frame and the first calibration data for that frame.

Figure 6:
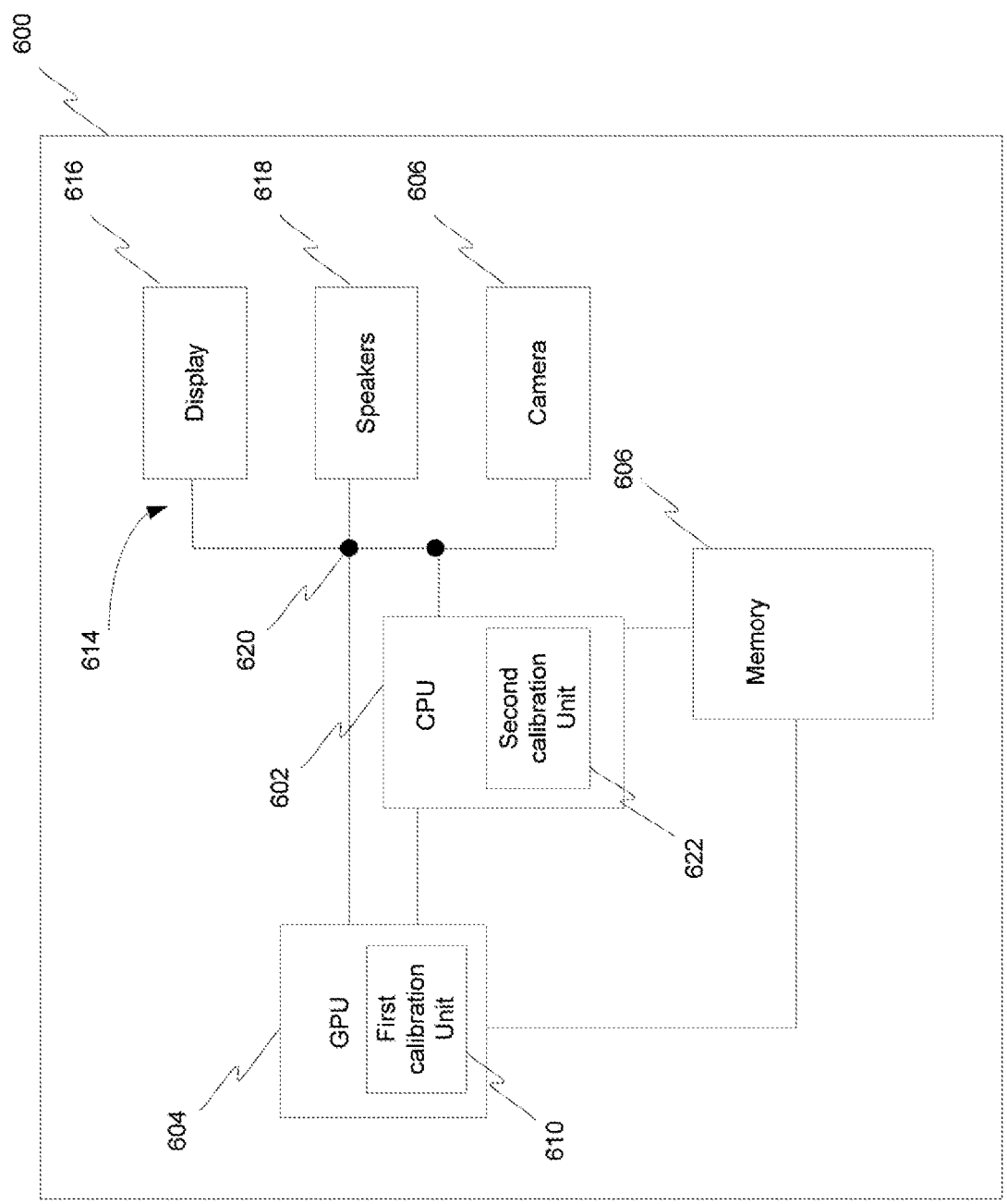
FIG. 6 shows a computer system in which the apparatus may be implemented.

FIG. 6 shows a computer system 600 in which the apparatuses described herein may be implemented. The computer system comprises a CPU 602, a GPU 604, a memory 606 and other devices 614, such as a display 616, speakers 618 and a camera 606. A first calibration unit 610 (corresponding to calibration unit 202, 302 or 402) is implemented on the GPU 604. A second calibration unit 622 (corresponding to calibration unit 204, 304 or 404) is implemented on the CPU 602. The components of the computer system can communicate with each other via a communications bus 620.

The apparatus of FIGS. 2-4 are shown as comprising a number of functional blocks and units. This is schematic only and is not intended to define a strict division between different logic elements of such entities. Each functional block may be provided in any suitable manner. It is to be understood that intermediate values described herein as being formed by a particular unit need not be physically generated by the unit at any point and may merely represent logical values which conveniently describe the processing performed by the unit between its input and output.

The units described herein may be embodied in hardware on an integrated circuit. The units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an apparatus configured to perform any of the methods described herein, or to manufacture an apparatus comprising any apparatus described herein. An integrated circuit definition dataset may be, for example, an integrated circuit description.

There may be provided a method of manufacturing, at an integrated circuit manufacturing system, an apparatus as described herein. There may be provided an integrated circuit definition dataset that, when processed in an integrated circuit manufacturing system, causes the method of manufacturing an apparatus to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an apparatus will now be described with respect to FIG. 7.

Figure 7:
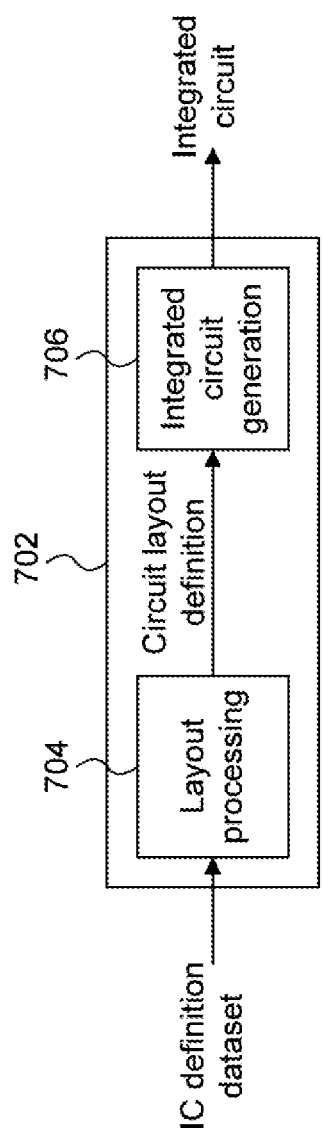
FIG. 7 shows an integrated circuit manufacturing system for generating an integrated circuit embodying an apparatus.

FIG. 7 shows an example of an integrated circuit (IC) manufacturing system 702 which is configured to manufacture an apparatus as described in any of the examples herein. In particular, the IC manufacturing system 702 comprises a layout processing system 704 and an integrated circuit generation system 706. The IC manufacturing system 702 is configured to receive an IC definition dataset (e.g. defining an apparatus as described in any of the examples herein), process the IC definition dataset, and generate an IC according to the IC definition dataset (e.g. which embodies an apparatus as described in any of the examples herein). The processing of the IC definition dataset configures the IC manufacturing system 702 to manufacture an integrated circuit embodying an apparatus as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 702 may be a distributed system such that some of the processes may be performed at different locations, and may be performed by no different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an apparatus without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems described herein may be embodied in hardware on an integrated circuit. The graphics processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. An apparatus for calibrating a camera capturing a sequence of frames, the apparatus comprising:
   a first calibration unit configured to perform a first calibration for frames of the sequence to calculate for those frames first calibration data for a set of one or more camera parameters; and
   a second calibration unit configured to perform a second calibration for selected frames of the sequence to calculate second calibration data for those frames for the set of one or more camera parameters in dependence on the first calibration data for those frames;
   wherein the first calibration unit comprises a selector unit configured to select frames for the second calibration and is configured to use the second calibration data to perform the first calibration for subsequent frames of the sequence.

2. An apparatus as claimed in claim 1, wherein the first calibration is a real-time calibration performed on frames of the sequence.

3. An apparatus as claimed in claim 1, wherein the first calibration is performed on each of the frames of the sequence.

4. An apparatus as claimed in claim 1, wherein the second calibration is a non-real time calibration.

5. An apparatus as claimed in claim 1, wherein the selector unit is configured to select frames for the second calibration in dependence on the first calibration data for those frames.

6. An apparatus as claimed in claim 5 wherein the selector unit is configured to select frames for the second calibration further in dependence on image metadata associated with those frames.

7. An apparatus as claimed in claim 1 wherein the selector unit is configured to select frames for the second calibration by periodically selecting a frame.

8. An apparatus as claimed in claim 1, wherein the first calibration unit is configured to, as part of the first calibration for a frame of the sequence, perform an incremental calibration for the frame based on the first calibration data calculated for a previous frame of the sequence.

9. An apparatus as claimed in claim 1, wherein the second calibration unit is configured to calculate the second calibration data for a selected frame of the sequence using calibration data for a plurality of previous frames of the sequence.

10. An apparatus as claimed in claim 1, wherein the first calibration unit comprises: a correction unit configured to use the second calibration data for selected frames to calculate corrections; and a calibration calculation unit configured to calculate estimated calibration data as part of the first calibration for subsequent frames of the sequence and to apply corrections to those estimates.

11. An apparatus as claimed in claim 10, wherein the corrector unit is configured to determine each of the corrections from a comparison of the second calibration data for a selected frame and the first calibration data of that selected frame.

12. An apparatus as claimed in claim 10, wherein the calibration calculation unit is configured to apply a correction determined from the second calibration data for a selected frame to an estimate of calibration data calculated as part of the first calibration for one or more frames of the sequence subsequent to that selected frame.

13. An apparatus as claimed in claim 12, wherein the calibration calculation unit is configured to determine the first calibration data for each of the said one or more frames of the sequence subsequent to the selected frame from: i) an estimate of the set of camera parameters determined from an incremental calibration; and ii) a correction determined from a comparison of the second calibration data for the selected frame and the first calibration data for that selected frame.

14. An apparatus as claimed in claim 12, wherein the calibration calculation unit is configured to apply the correction in its entirety to the estimate of calibration data for a single frame of the sequence subsequent to that selected frame.

15. An apparatus as claimed in claim 12, wherein the calibration calculation unit is configured to apply the correction incrementally to the estimates of calibration data for a plurality of frames of the sequence subsequent to that selected frame.

16. An apparatus as claimed in claim 1, wherein the set of one or more calibration parameters comprises intrinsic and/or extrinsic parameters of the camera.

17. An apparatus as claimed in claim 16, wherein the intrinsic parameters include at least one of: the focal length, optical centre of the camera, radial distortion parameters and pixel skew coefficients; and the extrinsic parameters include at least one of: the camera's position, the camera's orientation and the camera's pose.

18. A method of calibrating a camera, comprising:
   performing a first calibration for frames of a sequence captured by the camera to calculate for those frames first calibration data for a set of one or more camera parameters;
   performing, for selected frames of the sequence, a second calibration to calculate for the selected frames second calibration data for the set of one or more camera parameters in dependence on the first calibration data for those frames; and
   using the second calibration data in the first calibration performed for subsequent frames of the sequence;
   wherein the first calibration comprises selecting frames for the second calibration.

19. A non-transitory computer-readable storage medium having stored thereon computer-readable instructions that, when executed at a computer system, cause the computer system to perform a method of calibrating a camera, comprising:

performing a first calibration for frames of a sequence captured by the camera to calculate for those frames first calibration data for a set of one or more camera parameters;

performing, for selected frames of the sequence, a second calibration to calculate for the selected frames second calibration data for the set of one or more camera parameters in dependence on the first calibration data for those frames; and using the second calibration data in the first calibration performed for subsequent frames of the sequence; wherein the first calibration comprises selecting frames for the second calibration.

* * * * *